United States Patent Office 3,468,829
Patented Sept. 23, 1969

3,468,829
GRAVURE INK FOR PAPER
Hiroshi Yoshioka, Osaka, Toshio Oishi, Suita-shi, Osaka-fu, and Kenji Kanehira, Yao-shi, Osaka-fu, Japan, assignors to Arakawa Rinsan Kagaku Kogyo Kabushiki Kaisha, Osaka, Japan, a juridical person of Japan
No Drawing. Filed Oct. 22, 1965, Ser. No. 502,279
Claims priority, application Japan, Oct. 31, 1964, 39/61,966
Int. Cl. C09d 11/10
U.S. Cl. 260—27                                                 10 Claims

ABSTRACT OF THE DISCLOSURE

Gravure inks for paper comprising a vehicle containing a binder dissolved in an aromatic hydrocarbon solvent and a pigment dispersed therein, the essential binder of said vehicle being a modified petroleum resin, prepared by reacting petroleum resin in molten state with an $\alpha,\beta$-unsaturated dicarboxylic acid and reacting the resultant adduct with a reactive compound of a metal belonging to Group II of Periodic Table.

---

The present invention relates to gravure ink for paper, particularly to gravure ink for paper containing as a binder a specific modified petroleum resin.

A gravure ink is required not only to be inexpensive but also to have high gloss in printing with quick drying, to be free of blocking and sticking due to high-speed printing, and to have excellent stability in viscosity.

To meet these requirements the gravure ink has heretofore been manufactured by mixing pigments with a vehicle prepared by dissolving in an organic solvent a modified rosin such as a limed rosin. Such well known conventional gravure ink, however, has proved not necessarily satisfactory in stability of viscosity and gloss in print.

While various synthetic resins are used in the manufacture of lacquers and varnishes, there have been introduced no binders for gravure ink which excel limed rosin in their economics and performance.

The present inventors have continued researches for obtaining binders for gravure ink using, as material, petroleum resins which are not expensive, being available in large quantities. We failed, however, in initially attempting to mix pigments with a vehicle prepared by dissolving a petroleum resin directly in an organic solvent. The gravure ink thus prepared proved to be inferior in gloss in print, drying property and stability of viscosity, rendering later use impossible. The main object of the present invention is, therefore, to provide an excellent gravure ink which is free from said evils by employing petroleum resins that are inexpensive and abundantly supplied, and to be more particular, is to provide a gravure ink having a markedly higher gloss in printing than those in which are used a binder consisting in a limed rosin, and being quick-drying, free of blocking and sticking in high-speed printing and stable in viscosity.

Other objects of the invention will be clear from the description to follow.

We have discovered as the result of further researches that it is possible to manufacture a gravure ink which satisfies the object of the invention by employing as a binder of the vehicle for gravure ink a specific modified petroleum resin. Said modified petroleum resin is obtained by reacting a petroleum resin in the initial step in molten state with $\alpha,\beta$-unsaturated dicarboxylic acid, and in the second step, reacting the resultant adduct with a reactive compound of a metal belonging to the Group II of Periodic Table to produce a desired salt.

The petroleum resin used as a starting material according to the invention is an unsaturated hydrocarbon resin obtained by polymerizing petroleum streams boiling between −20° C. and 280° C. in the presence of a Friedel-Craft's catalyst. Said unsaturated hydrocarbon resin is disclosed in the following literature: U.S.P. No. 2,698,841; U.S.P. No. 2,762,851; U.S.P. No. 2,933,468; "Sekiyu to Sekiyu Kagaku" (Petroleum and Petroleum Chemistry, published by Kabushiki Kaisha Saiwai Shobo, Japan) vol. 5, No. 8, p. 3 (1961); and ibid. vol. 5, No. 9, p. 32 (1961).

Said petroleum streams are produced abundantly in the process of stream-cracking of petroleum naphtha, and can be polymerized in the presence of a Friedel-Craft's catalyst after fractional distillation thereof as required. Normal polymerization temperature is below 100° C. A petroleum resin has an ethylenic double-bond in its molecule, its property varying according to the streams used and polymerization conditions, but usually has a molecular weight, 300–2,000; Ball and Ring softening point, 50–130° C.; bromine value, 5–80; acid value, 0–5 and saponification value, 0–5.

In the invention any petroleum resin of not only said physical properties but also other properties than said range can be employed, but most desirable are those particularly having softening point and bromine value within said range.

The term, $\alpha,\beta$-unsaturated dicarboxylic acid, used in the specification includes anhydrides as well as acids, representative thereof being maleic acid, fumaric acid, citraconic acid, itaconic acid, and further maleic anhydride, citraconic anhydride, etc., and among these maleic anhydride is most desirable.

According to the present invention $\alpha,\beta$-unsaturated dicarboxylic acid is reacted with a petroleum resin in molten state. Reaction temperature should be in the range of between the melting point of petroleum resin and the boiling point of $\alpha,\beta$-unsaturated dicarboxylic acid, so the optimum reaction temperature should be selected depending on the kinds of petroleum resin and $\alpha,\beta$-unsaturated dicarboxylic acid used, 200–210° C. being generally desirable. In the reaction a peroxide catalyst, such as paratertiary butyl peroxide, tertiary butyl perbenzoate, or benzoyl peroxide can be used as required. The amount of dicarboxylic acid used should be decided according to petroleum resin and reaction conditions applied, normal amount being 1–30 weight percent, more particularly 3–15 weight percent in weight reduced to maleic anhydride, based on the weight of the starting petroleum resin. In the reaction system may be added an organic solvent for the petroleum resin so as to reduce a melt-viscosity of the petroleum resin. The mechanism of said reaction has not been well defined, but can be considered to be an addition reaction as stated in U.S.P. No. 2,933,468. In the resultant product is recognized to have a carboxylic group introduced due to $\alpha,\beta$-unsaturated dicarboxylic acid used, and reaction is easier when a petroleum resin of higher bromine value is used.

Said addition product in which a carboxylic group has been introduced is then subjected to reaction with a reactive compound of a metal belonging to the Group II of Periodic Table. Said reactive compounds comprise as representative of the kind oxides, halides and hydroxides of said metals such as magnesium, calcium, zinc, barium, strontium, cadmium, etc. The most suitable among the above are the oxides or hydroxides of calcium or zinc. In said reaction, there are available two processes, namely, reacting said adduct in molten state with the reaction compound of the divalent metal, and a conventional double decomposing process in which said adduct is first converted into an alkali metal salt in the presence of or absence of a solvent, followed by the reaction of said alkali salt with said reactive compound of the divalent metal. The former process is more economical, consisting in a fusion process, in which the reaction temperature depends upon the kinds of the adduct and reactive compound, generally temperature, 200–280° C. or so being applicable. The reaction takes place only by heating whereas reaction velocity can be accelerated by employing as a catalyst a metallic salt of aliphatic monocarboxylic acid, the most desirable catalyst being calcium acetate. The desirable amount of the reactive compound based on the adduct is reaction equivalent or less. Generally, 2–8 weight percent, particularly 4–7 weight percent (in weight reduced to calcium) of said reactive compound, based on the weight of the adduct, is applicable.

By the above reaction, part or all of carboxylic group introduced in the petroleum resin forms a salt with a metal belonging to the Group II of Periodic Table, whereby increasing the polarity, molecular weight and softening point of the petroleum resin.

In the process of manufacturing the abovementioned specific modified petroleum resin according to the present invention, various desirable changes can be made, for instance, in the first process of reacting the petroleum resin and $\alpha,\beta$-dicarboxylic acid, the reaction can be completed in the presence of a rosin, said rosin being gum rosin, wood rosin or tall-oil rosin, or ester thereof or metallic salt thereof, said metal belonging to the Group II of Periodic Table.

In this case also, the reaction takes place in molten state, and $\alpha,\beta$-dicarboxylic acid is introduced not only in the petroleum resin but also in the rosin by addition reaction. The advantages of said process lie in the increased softening point of the resultant resin mixture as well as the improved drying property of the ink prepared with the resin mixture, and also in that the $\alpha,\beta$-dicarboxylic acid unreacted with the petroleum resin is consumed by reacting with the rosin, which eliminates a troublesome process to remove the unreacted acid. The time to add the rosin can be selected according to the kind of petroleum resin and $\alpha,\beta$-dicarboxylic acid used as starting materials, and the reaction conditions applied, for instance, when a petroleum resin of low reactivity having 5–20 bromine value is used as a starting material, the rosin can be added in the course of reaction of the petroleum resin and $\alpha,\beta$-dicarboxylic acid, and in the case of a petroleum resin or higher reactivity having more than 20 bromine value, the rosin can be added at the initial stage of or during said reaction, thus introducing $\alpha,\beta$-dicarboxylic acid in the petroleum resin and the rosin, whereby the resin mixture having a higher softening point is advantageously obtained.

In either case as abovementioned, even when a predominant amount of the rosin added remains in the unreacted state, it will not have an adverse effect on the product. Accordingly, the amount of the rosin to be added can vary from the theoretical amount on the basis of the acid to remain unreacted with petroleum resin to any larger amount, generally desirable being less than 2 times by weight of the rosin on the basis of the petroleum resin used.

Furthermore, in order to prevent the lowering of waterproof properties due to the introduction of a large amount of a carboxylic group, a process is available to esterify the unreacted carboxylic group introduced in the petroleum resin and/or rosin, and not forming a salt with metal belonging to the Group II of Periodic Table, by using aliphatic polyhydric alcohol, such as ethylene glycol, glycerine, pentaerythritol, diethylene glycol, propylene glycol, trimethylolalkane, neopentyl glycol. Said aliphatic polyhydric alcohol may be added to the reaction system at any stage, preferably at the end of the second step, i.e., the reaction of the adduct obtained by the first process and the reactive compound of metal belonging to the Group II of the Periodic Table and the amount thereof varies over a wide range, but desirable is a theoretical amount or less on the basis of the number of the carboxyl group to remain unreacted.

The method of adding said rosin and polyhydric alcohol is desirable where desired but not of absolute necessity.

The gravure ink for paper of the invention can be easily produced by dispersing pigments in a vehicle which has been prepared by dissolving the specific modified petroleum resin thus obtained in an organic solvent. A reinforcing filler, ethyl cellulose may be added, as is practiced in the industry, so as to improve flexibility and abrasion resistance of printed surfaces. Said ethyl cellulose is usually mixed with the vehicle in a form of aromatic hydrocarbon solution. The viscosity of the vehicle can be selected from a wide range depending on the kind of pigment to be mixed and mixing machine, and generally a viscosity more or less 30–150 cps./25° C. is desirable. When a pigment, Carmine 6B is used, and mixed by a sand mill, for instance, a vehicle with a viscosity, 40 cps./25° C. is suitable. The concentration of the resin may be such that the viscosity of the vehicle can be maintained within the above range, a concentration, 30–50 weight percent being widely employed. An aromatic hydrocarbon such as xylene, benzene, toluene, etc. can be used as a solvent for the resin.

The most common mixing ratio of the vehicle, pigment and reinforcing filler is as follows:

|  | Desirable extent | Optimum extent |
| --- | --- | --- |
| Vehicle (wt. parts) | 60–97 | 80–90 |
| Pigment (wt. parts) | 3–40 | 10–20 |

Reinforcing filler may be added, less than 12 weight percent, preferably less than 10 weight percent, based on the finished product.

The mixing ratio may be varied according to the use of the ink, so that the present invention is not intended to be limited to the above ranges.

In the preparation of the gravure ink of the invention, said modified petroleum resin may be either employed singly or in admixture with other resins such as cumarone-inden resin, limed rosin, hydrogenated rosin, disproportionated rosin, ester gum, rosin modified phenol resin, phenol-formaldehyde condensate, alkylphenolformaldehyde condensate, rosin modified maleic resin, etc.

The following illustrative examples are given for a better understanding of the invention.

EXAMPLE 1

In a 300 liter stainless steel reactor were placed 100 kg. of brownish transparent petroleum resin, having Ball and Ring softening point, 65° C., bromine value, 43.9 and molecular weight, 600; 15 kg. of maleic anhydride; and 1 kg. of paratertiarybutylperoxide, and the system was gradually heated to melting with stirring until the temperature was raised to 145° C. and the temperature maintained for 1 hour, then raised to 200° C. in further 30 minutes and maintained to continue fusion reaction for 30 minutes, after which were added 8 kg. of calcium-hydroxide, and 0.5 kg. of calcium acetate, and again heated to 260° C. in 1 hour, and left for reaction for 3 hours. After the operation, the pressure in the reactor was slightly reduced to remove a small amount of volatile substance, and then 115 kg. of modified petroleum resin, having acid value, 59.2 and softening point, 114° C. were poured from the kettle.

The resultant modified petroleum resin was dissolved in the equivalent amount of toluene, and toluene was added further to dilute the solution until a viscosity, 40 centipoise at 25° C. was obtained, thus producing a vehicle. To 88 weight parts of the resultant vehicle was added 12 weight parts of Carmine 6B pigment and mixed in a sand-mill to produce the printing ink.

EXAMPLE 2

In a 300 liter stainless steel reactor were placed 100 kg. of brown transparent petroleum resin, having softening point, 65° C., bromine value, 43.9 and molecular weight, 600; and 20 kg. of maleic anhydride, and heated to melting with stirring rapidly up to 200° C., and maintained for 3 hours at 200–210° C. to continue the fusion reaction, after which 9 kg. of calcium hydroxide and 0.5 kg. of calcium acetate were added, and further heated with stirring up to 260° C. in 1 hour, and left for reaction for 3 hours. By reducing pressure in the reactor, a small amount of volatile substance was removed, and 120 kg. of the desired modified petroleum resin, having acid value 47.8, softening point, 117° C. were obtained.

The toluene solution of the resultant modified petroleum resin prepared in exactly same manner as Example 1 was mixed with Carmine 6B pigment to produce the desired printing ink.

EXAMPLE 3

A 300 liter stainless steel reactor was charged with 50 kg. of petroleum resin, having softening point, 65° C., bromine value, 43.9 and molecular weight, 600; and 9 kg. of maleic anhydride, and heated to melting with stirring at 200–210° C. for 2 hours, after which was added thereto 50 kg. of gum rosin, having softening point, 81° C. and acid value 165 and heated for 1 hour at 200° C., and further heated up to 260° C. in 1 hour during which operation 7 kg. of calcium hydroxide and 0.5 kg. of calcium acetate were added in 10 successive portions, after which the reaction mixture was heated with stirring for 3 hours at 255–265° C.

The pressure in the reactor was reduced to remove a small amount of volatile substance. 110 kg. of resultant resin having acid value, 39.5 and softening point, 160° C. were poured out.

The gravure ink for paper was prepared by processing the resultant modified petroleum resin in the same manner as Example 1.

EXAMPLE 4

A 300 liter stainless steel reactor was charged with 50 kg. of petroleum resin, having softening point, 65° C., bromine value, 43.9, molecular weight, 600; 50 kg. of tall-oil rosin, and 10 kg. of fumaric acid, and heated to melting with stirring at 200–210° C. for 1 hour after which 7 kg. of calcium hydroxide and 0.5 kg. of calcium acetate were added thereto and raised to 260° C. in 1 hour, and stirring was continued for 3 hours, after which the pressure in the reactor was reduced and a slight amount of volatile substance was removed.

110 kg. of the resultant modified petroleum resin was taken out from the reactor, having acid value, 53.9 and softening point, 181° C.

The resultant resin was prepared into a gravure ink for paper in the same manner as Example 1.

EXAMPLE 5

A 300 liter stainless steel reactor was charged with 50 kg. of petroleum resin, having softening point, 65° C., bromine value, 43.9 and molecular weight 600; 10 kg. of maleic anhydride, and 0.5 kg. of ditertiarybutylperoxide, and gradually heated to melting with stirring up to 145° C., maintained for 1 hour, and further raised to 200° C. in 30 minutes and maintained for 30 minutes after which was added 50 kg. of gum rosin, having softening point, 81° C. and acid value, 165, and heated at 200° C. for 1 hour, and then raised to 260° C. in 1 hour during which operation were introduced through the inlet 8 kg. of calcium hydroxide, 0.5 kg. of calcium acetate and 1 kg. of zinc oxide in 6 successive portions, and again heated with stirring at 255–265° C. for 3 hours. The pressure in the reactor was reduced and a small amount of volatile substance was removed. 112 kg. of the resultant modified petroleum resin had acid value, 45.1 and softening point, 190° C.

The resultant resin was prepared into a gravure ink for paper in the same manner as Example 1.

EXAMPLE 6

A 300 liter stainless steel reactor was charged with 50 kg. of petroleum resin, having softening point, 65° C., bromine value, 43.9 and molecular weight 600; and 50 kg. of tall-oil rosin, having softening point 75° C. and acid value, 168, and heated to melting with stirring up to 200° C., where 7 kg. of maleic anhydride and 7 kg. of phenolformaldehyde pre-condensate (resin content, 70%), prepared as shown below were added and heated with stirring at 200° C. for 1 hour, and further raised to 230° C. in 30 minutes, then were added 7 kg. of calcium hydroxide, 0.5 kg. of calcium acetate and 2 kg. of zinc oxide and raised to 260° C. in 30 minutes and maintained for 3 hours. Then pressure in the reactor was reduced and a small amount of volatile substance was removed. The resultant modified petroleum resin, 115 kg. in quantity, had acid value 47.0 and softening point, 179° C.

The resultant modified petroleum resin was prepared into a gravure ink for paper in the same manner as Example 1.

Said phenolformaldehyde pre-condensate was prepared as follows:

After reacting for 30 minutes at 80° C., 17 kg. of phenol, 22 kg. of 37% solution of formaline and 0.3 kg. of calcium hydroxide, the system was neutralized with acetic acid, washed with water and then dehydrated and condensed to 70% resin content.

EXAMPLE 7

In the course of manufacturing the modified petroleum resin in exactly same manner as Example 1, after the reaction of the resin with calcium compound, and before reducing pressure in the reactor, 1 kg. of glycerol was added, and heated with stirring at the same temperature, i.e., 260° C. for 2 hours, and by further processing as Example 1, a gravure ink for paper was produced.

For comparison the results of tests of gravure inks for invention, the results of tests for stability of viscosity, drying property and gloss of the gravure ink obtained by the above examples are given in the appended table in comparison with inks of the comparative examples. The above tests were conducted by the following measurement.

(a) Stability of viscosity test

The viscosity of the ink immediately after preparation and that of after 7 days were measured by Brookfield viscometer. The lesser the difference in measured viscosity between the two, the better is the stability of viscosity.

(b) Drying property test 1 gram of the ink to be tested was placed in Petri dish, 60 mm. dia and after lapse of 1 hour the weight reduced by evaporation of the solvent originally contained was measured.

Percent

Evaluation, reduction in weight by vaporization:
 Excellent _____ Over 80
 Good _____ 50–80
 Poor _____ Under 50

(c) Gloss test

The ink to be tested was applied to a gravure paper with a bar-coater, and the gloss on the printed face was measured at the angles of 60°—60° of regular reflectivity.

For comparison the results of tests of gravure inks for paper, prepared by the methods as described in the following Comparative Examples 1–3 are given in the Table 1 below.

Comparison-1. Limed rosin.—A 300 liter stainless steel reactor was charged with 100 kg. of gum rosin, having softening point, 81° C. and acid value 165; 4 kg. of calcium hydroxide and 0.2 kg. of calcium acetate, and gradually heated up to 220° C. with stirring and maintained for 3 hours at the temperature. After reducing pressure in the reactor, and removing volatile substance, 102 kg. of limed rosin was obtained, having acid value, 95.0 and softening point, 115° C. The resultant limed rosin was prepared into a gravure ink for paper in the same manner as the Example 1.

Comparison-2. Unmodified petroleum resin.—A brown transparent massive petroleum resin having softening point, 65° C., bromine value, 43.9, molecular weight, 600 was dissolved in the same amount of toluene, and was further added thereto toluene as a diluent until viscosity 40 centipoise at 25° C. was obtained to produce a vehicle for printing ink. 88 parts of said vehicle and 12 parts of Carmine 6B pigment were mixed in a sand-mill to produce the ink.

Comparison-3. Unmodified petroleum resin.—Employing a brown transparent massive petroleum resin, having softening point, 120° C., bromine value, 21.5 and molecular weight, 850 a gravure ink for paper was produced in the similar manner to the above Comparison-2.

TABLE 1

| Ink tested | Stability of viscosity | | Drying property | Gloss (percent) |
|---|---|---|---|---|
| | Viscosity after preparation (centipoise) | Viscosity 7 days after preparation (centipoise) | | |
| Example: | | | | |
| 1 | 92 | 96 | Good | 45.4 |
| 2 | 90 | 95 | do | 41.6 |
| 3 | 88 | 120 | Excellent | 23.7 |
| 4 | 98 | 100 | do | 24.1 |
| 5 | 90 | 80 | do | 19.0 |
| 6 | 85 | 86 | do | 16.3 |
| 7 | 90 | 98 | Good | 44.2 |
| Comparison: | | | | |
| 1 | 95 | 2,700 | do | 8.5 |
| 2 | 96 | 2,800 | Poor | 8.5 |
| 3 | 94 | 3,100 | do | 8.7 |

From the above results it is obvious that inks according to the present invention afford markedly excellent viscous stability, drying properties and gloss, compared with inks of the comparative examples.

In the above tests, in particular, those inks having gloss values exceeding 12% exhibited splendid visual gloss on the printed surfaces, and as in Examples 5 and 6 in which rather smaller amounts of modified petroleum resin were used, these inks of the invention exhibited satisfactory gloss and excellent drying properties. By using larger amounts of modified petroleum resin, these inks will have increased gloss.

What is claimed is:

1. A gravure ink for paper comprising a vehicle containing a binder dissolved in an aromatic hydrocarbon solvent and a pigment dispersed therein, the essential binder of said vehicle being a modified petroleum resin, prepared by reacting petroleum resin in molten state with an α,β-unsaturated dicarboxylic acid and reacting the resultant adduct with a reactive compound of a metal belonging to Group II of Peroidic Table.

2. The gravure ink for paper of claim 1, wherein said starting petroleum resin is an ethylenically unsaturated hydrocarbon polymer having a bromine value of 5 to 80 and a Ball and Ring softening point of 50 to 130° C., and prepared by Friedel-Craft's polymerization of a steam cracked petroleum stream boiling between about —20 and 280° C.

3. The gravure ink for paper of claim 1, wherein said α,β-unsaturated dicarboxylic acid is one member of the group consisting of maleic acid, fumaric acid, citraconic acid, itaconic acid, maleic anhydride and citraconic anhydride.

4. The gravure ink for paper of claim 1 wherein said reactive compound of metal belonging to Group II of Periodic Table is one member of the group consisting of calcium hydroxide and zinc oxide.

5. The gravure ink for paper of claim 1, wherein said α,β-unsaturated dicarboxylic acid is employed in the order of 1–30 weight percent on the basis of the weight of the starting petroleum resin.

6. The gravure ink for paper of claim 1, wherein said reactive compound of metal is employed in the order of 2–8 weight percent on the basis of the weight of the resulting adduct.

7. The gravure ink for paper of claim 1, wherein the petroleum resin and α,β-unsaturated dicarboxylic acid are reacted in the presence of the rosin in an amount varying between a theoretical amount on the basis of α,β-unsaturated dicarboxylic acid to remain unreacted with said petroleum resin and 2 times by weight on the basis of the petroleum resin, so as to introduce the α,β-unsaturated dicarboxylic acid in the petroleum resin and the rosin by addition reaction.

8. The gravure ink for paper of claim 1, wherein the α,β-unsaturated dicarboxylic acid-petroleum resin adduct and the reactive compound of the metal are reacted in the presence of aan aliphatic polyhydric alcohol, so as to form a salt and also to esterify the carboxyl group of the adduct with said alcohol.

9. The gravure ink for paper of claim 1, wherein said vehicle has a viscosity of 30–150 cps. at 25° C.

10. The gravure ink for paper of claim 1, wherein the mixing proportion of the vehicle and pigment is as following:

Wt. parts
Vehicle ------------------------------------ 60–97
Pigment ------------------------------------ 3–40

References Cited
UNITED STATES PATENTS

| 2,327,594 | 8/1943 | Erickson et al. | 106—30 |
| 2,327,595 | 8/1943 | Erickson et al. | 106—30 |
| 2,327,596 | 8/1943 | Erickson et al. | 106—30 |
| 2,327,597 | 8/1943 | Erickson et al. | 106—30 |

JULIUS FROME, Primary Examiner

J. B. EVANS, Assistant Examiner

U.S. Cl. X.R.

106—32, 232, 234, 30; 260—24, 28, 28.5